(No Model.)
W. B. ELTONHEAD.
NUT LOCK.
No. 285,399.          Patented Sept. 25, 1883.
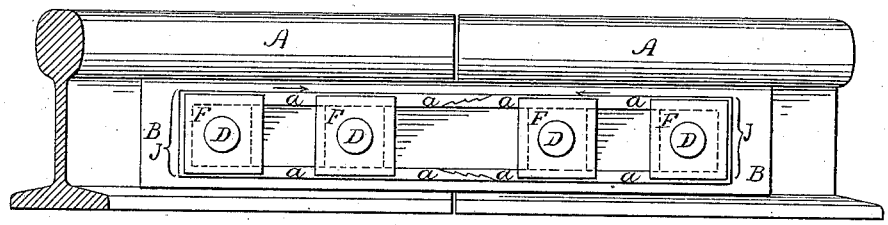
FIG. 1
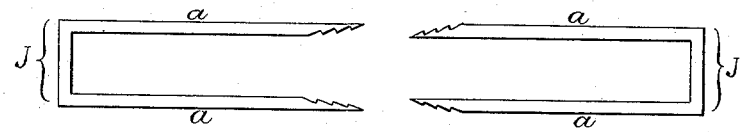
FIG. 3
FIG. 2
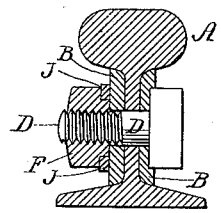
WITNESSES:
Harry Drury
Hamilton D. Turner
INVENTOR:
William B. Eltonhead
by his Attorneys
Howsm and Sons

UNITED STATES PATENT OFFICE.

WILLIAM B. ELTONHEAD, OF PHILADELPHIA, PA., ASSIGNOR, BY DIRECT AND MESNE ASSIGNMENTS, TO THE UNITED STATES LOCK NUT COMPANY, (LIMITED,) OF SAME PLACE.

NUT-LOCK.

SPECIFICATION forming part of Letters Patent No. 285,399, dated September 25, 1883.

Application filed February 23, 1883. (No model.)

*To all whom it may concern:*

Be it known that I, WILLIAM B. ELTONHEAD, a citizen of the United States, and a resident of Philadelphia, Pennsylvania, have invented certain Improvements in Nut-Locks, of which the following is a specification.

The object of my invention is to construct a simple, cheap, and efficient device for locking two or more nuts; and this object I attain in the manner which I will now proceed to describe, reference being had to the accompanying drawings, in which—

Figure 1 is a side view of a railway-rail joint with my improved nut-locking device; Fig. 2, a transverse section, and Fig. 3 a detached view of the locking-bars.

A A represent the ends of the rails; B B, the opposite fish-plates; D, the bolts, and F the nuts, all of these parts being constructed as usual, with the exception of the nuts F, each of which is recessed on the side next the fish-plate, the recess extending entirely around the nut.

The locking device comprises the two forked bars, J J, made of steel or other metal possessing the requisite elasticity, the distance between the opposite arms $a$ of each bar being such that the said bar is adapted to fit snugly to the recessed inner portions of the nuts F. At the inner or open end of each bar J the arms $a$ are toothed, and the toothed arms of one bar are adapted to interlock with those of the other bar when said arms are brought together.

In using the device the nuts F are first squared or adjusted, so as to be parallel with each other, as shown in Fig. 1, each nut of course being screwed up as tightly as this parallel adjustment will permit. The bars J are then slipped or driven longitudinally over the recessed inner portions of the nuts—one from one end and the other from the opposite end of the row—as shown by the arrows. When the toothed ends of the arms $a$ of one bar meet those of the other bar, there will be a yielding of one or both of the bars, in order to permit the interlocking of said toothed portions of the arms, the elasticity of the bars being sufficient for this purpose. When the bars are thus interlocked, as shown in Fig. 1, the nuts will be securely held, and accidental displacement of the locking-bars will be impossible, the two bars forming, practically, a unit incapable of longitudinal movement on the nuts, and the shoulders of said nuts formed by recessing the inner faces of the same preventing any lateral displacement of the bars. The bars can be readily removed, when desired, however, by springing the inner ends of one or both of the same, so as to free the toothed portions of the arms, and thus permit the longitudinal withdrawal of the bars in directions the reverse of those pointed out by the arrows.

My improved nut-lock is not limited to rail-joints, but can be applied to any machine or structure where there are two or more nuts in line with and in proximity to each other.

I claim as my invention—

1. A nut-lock comprising two forked elastic bars adapted to embrace opposite nuts, and having their open ends constructed to engage and interlock, as set forth.

2. The combination of the recessed nuts with the forked elastic bars having their open ends constructed to engage and interlock, as set forth.

In testimony whereof I have signed my name to this specification in the presence of two subscribing witnesses.

WILLIAM B. ELTONHEAD.

Witnesses:
HARRY L. ASHENFELTER,
HARRY SMITH.